US008667878B1

(12) United States Patent
Lu

(10) Patent No.: US 8,667,878 B1
(45) Date of Patent: Mar. 11, 2014

(54) MULTI-FUNCTION MANUAL SALAD PREPARATION UNIT

(75) Inventor: Cong Qiang Lu, Zhejiang (CN)

(73) Assignee: Premier Kitchen Products, New York City, NY (US)

( * ) Notice: Subject to any disclaimer, the term of this patent is extended or adjusted under 35 U.S.C. 154(b) by 205 days.

(21) Appl. No.: 13/177,360

(22) Filed: Jul. 6, 2011

(51) Int. Cl.
   *B26D 1/02* (2006.01)
(52) U.S. Cl.
   USPC .............................................. 83/856; 83/932
(58) Field of Classification Search
   USPC .............. 99/495, 509; 30/298.4; 83/856–858, 83/932
   See application file for complete search history.

(56) References Cited

U.S. PATENT DOCUMENTS

| | | | | |
|---|---|---|---|---|
| 2,601,087 | A | * | 6/1952 | Buedingen ..................... 241/168 |
| 2,615,486 | A | * | 10/1952 | Marcus ......................... 241/168 |
| 3,698,460 | A | * | 10/1972 | Ashton et al. ............. 241/273.1 |
| 4,733,589 | A | * | 3/1988 | Wolff ............................... 83/858 |
| 4,790,488 | A | * | 12/1988 | Borner ........................... 241/95 |
| 5,745,999 | A | * | 5/1998 | Zirkiev ........................... 30/278 |
| D426,743 | S | * | 6/2000 | Wong ............................ D7/384 |
| 6,622,618 | B1 | * | 9/2003 | Glucksman et al. ........... 99/495 |
| 2009/0183611 | A1 | * | 7/2009 | Khubani ........................... 83/13 |
| 2011/0100179 | A1 | * | 5/2011 | Burke et al. .................... 83/167 |

FOREIGN PATENT DOCUMENTS

CN          201089171 Y  *  7/2008

* cited by examiner

*Primary Examiner* — Henry Yuen
*Assistant Examiner* — John J Norton
(74) *Attorney, Agent, or Firm* — Andrew S. Langsam; Pryor Cashman LLP

(57) ABSTRACT

A multi-function salad preparation unit is provided, including a salad bowl having an upper rim and a mandoline slicer. The mandoline slicer fits on the upper rim of the salad bowl and includes a main platform along which food is to be slid, and a cutting tool disposable in the main platform, with a space adjacent the cutting edge of the tool. When food is slid across the main platform, the cutting edge removes a quantity of the food which falls through the space and into the salad bowl. The mandoline slicer preferably includes a first slot with the cutting tool insertable into the first slot substantially co-planar with an upper surface of the main platform. A second slot is also preferably provided, disposed below the upper surface, for cutting tool storage. Multiple interchangeable cutting tools, e.g., slicer(s), dicer(s), grater(s), are selectively disposable in the first and second slots.

8 Claims, 4 Drawing Sheets

MULTI-FUNCTION MANUAL SALAD PREPARATION UNIT

BACKGROUND OF THE INVENTION

1. Field of the Invention

The invention relates to manual kitchen tools, and more specifically to manual food preparation devices adapted to prepare and augment salads and similar foods.

2. Description of Related Art

Salads are a staple of the cuisines of many parts of the world. Often a leafy green vegetable such as spinach or a form of lettuce (hereinafter "lettuce") is used as a base material, and other ingredients such as other vegetables, fruits, nuts, and cheeses are added. A dressing, typically oil-based, is applied thereto for flavor. In addition to being widely prevalent the world over, salads are typically extremely healthy portions of a meal, often containing significant quantities of fiber, vitamins, and minerals.

Yet, as popular and healthful as salads are as a course in a meal, they can represent a significant and inconvenient amount of work in terms of preparation and clean-up, for several reasons. First, the lettuce must be washed thoroughly to get rid of bugs, sand, dirt, and other undesirable detritus. The lettuce is typically washed by hand under water, and it is often dried by being spun in a salad spinner. A conventional salad spinner includes a colander-like inner holder rotatably disposed within an outer bowl-like container. The lettuce is placed inside the inner holder, a rotating or vertically hinged and reciprocating actuator is placed atop the outer bowl-like container, and as the actuator is operated, either spinning or by reciprocation, that mechanical movement is translated such that the inner holder is rotated rapidly like a centrifuge to spin the water out of the lettuce. The water collects in the outer container, and the contents of the inner container are transferred to another salad bowl. After that, vegetables such as cucumbers, tomatoes, and the like are typically sliced with a knife on a cutting board or a plate and then transferred to the salad. After that, optionally, cheese may be grated into yet another bowl using a cheese grater and then dispersed atop the salad. Additional ingredients may require additional steps and additional surfaces and/or utensils, all of which will require cleaning after the preparation of the salad.

One advance in the art is a table top mandoline slicer, which can quickly create slices of vegetables with regular thickness. Yet, even this device requires the slicing of the food in question over a plate or cutting board and subsequent transfer of the sliced food to the salad.

Overall, the vast amount of preparation and subsequent cleanup required to make a reasonably respectable salad often makes the process too labor-intensive for many people who have neither the time nor the inclination to invest in a segment of a meal that is not even a main course. Yet, since many people do not each sufficient quantities of vegetables or fiber, it would be desirable to encourage people to eat more salads, and thus it would be desirable for such salads to be easier to make and clean up after. Accordingly, there is a long-felt need to create a device or system that enables people to prepare salads easily and efficiently using fewer tools and surfaces while creating less concomitant kitchen cleanup.

SUMMARY OF THE INVENTION

The invention is a multi-function salad preparation unit. A salad bowl having an upper bowl rim may be provided as part of the unit or may be sold separately. In either event, a salad bowl mandoline slicer is provided, having a rim adapted to fit selectively on the upper rim of the salad bowl; a main platform across which food is to be slid; and a cutting tool having at least one cutting edge disposable in the main platform and a space adjacent to the at least one cutting edge. When food is slid across the main platform, the cutting edge removes a quantity of the food, and the removed quantity falls through the space and into the salad bowl. The mandoline slicer preferably includes a first slot, and the cutting tool is insertable into the first slot substantially co-planar with an upper surface of the main platform. A second slot is also preferably disposed below the upper surface, the cutting tool being selectively disposable in the second slot for storage. A second cutting tool may preferably be provided, selectively disposable in the first and second slots. The first and second cutting tools can each be a slicer, a dicer, or a grater, or the like. If both cutting tools are the same type of tool (slicer, grater, etc.), they can optionally be of different gauges, e.g., different thickness slicers, different "chunk-size" graters, etc.

The multi-function salad preparation unit of the invention may preferably include a salad spinner having a rotatable colander disposable in the salad bowl and a rotational actuator (or a hinged, vertically reciprocating actuator) either of which is mechanically coupled to rotation of the basket within the salad bow. With the spinner mechanism selectively disposable atop the upper rim of the salad bowl in place of the mandoline slicer, either rotation of the salad spinning mechanism or vertical pumping/reciprocation of the actuator causes the basket within the bowl to rapidly spin within the bow. This causes the salad with water to spin and the water, smaller than the spacing between vertical ridges in the basket than the lettuce, will fly out, radially, by the centrifugal force and thus the lettuce is dried of the cleaning water. The invention may also include a lid sealingly attachable to the upper rim of the salad bowl in place of the mandoline slicer and/or the salad spinner.

By creating a mandoline slicer having multi-purpose food reduction capabilities (e.g., slicing, dicing, grating, etc.) that fits directly atop a salad bowl and/or salad spinner, one need not slice, dice, or grate salad ingredients over a separate plate or cutting surface and transfer the food into the salad. Instead, one fits the inventive mandoline slicer atop the salad bowl and slices, dices, or grates directly into the salad in question. This reduces the number of items that need to be used and thus cleaned (e.g., no separate plate or cutting surface). Further, since one need not transfer the reduced food from one place to another, there is much less risk of dropping the food on the floor, in a sink, or otherwise having the reduced food end up in a similarly undesirable place.

DETAILED DESCRIPTION OF THE INVENTION AND DRAWINGS

Description will now be given with reference to the attached FIGS. 1-8. It should be understood that these figures are exemplary in nature and in no way serve to limit the scope of the invention, which is defined by the claims appearing hereinbelow.

Figure 2:
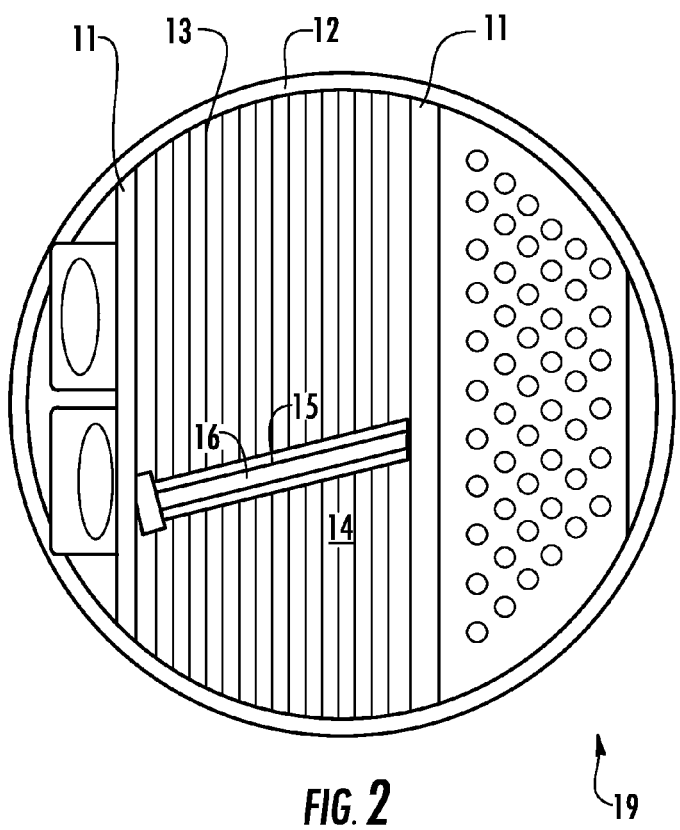
FIG. 2 is a top elevation view of the salad bowl mandoline slicer of FIG. 1.
Figure 1:
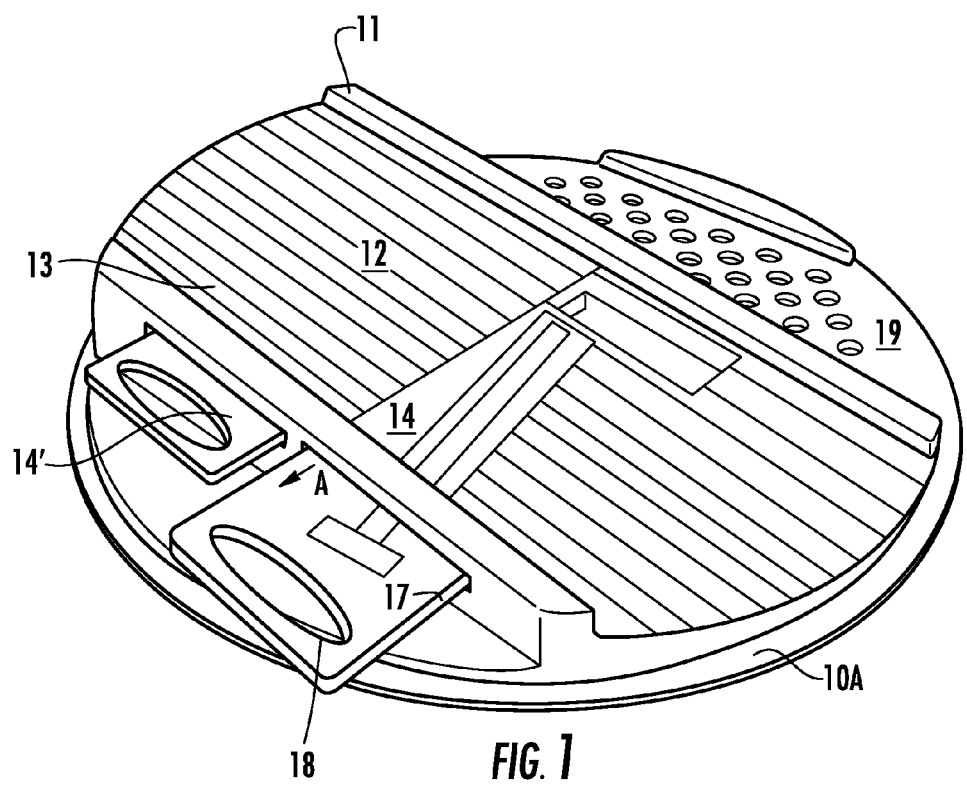
FIG. 1 is an upper perspective view of a salad bowl mandoline slicer in accordance with the invention with one of the cutting tools slightly withdrawn from its working slot.

As best shown in FIGS. 1 and 2, mandoline slicer 10 includes a pair of raised dividers 11 that delineate a main platform 12 along which food is to be slid to be sliced, diced, grated, or otherwise reduced. Raised longitudinal ridges 13 minimize the amount of cross-sectional area the food comes in contact with main platform 12 and thus reduces the friction between the food and main platform 12. Raised ridges 13 also serve to channel any juice or other liquid from the food to prevent puddling. Disposed in main platform 12 is a removable cutting tool 14 having a cutting blade 16 and a space 15 substantially adjacent to cutting blade 16. Blade 16 is slightly angled upward from but otherwise substantially co-planar with, main platform 12, so that when food is slid along main platform 12 and across cutting tool 14, blade 16 slices, dices, or grates a portion of the food. The thus-reduced portion of the food falls down through space 15 and into the bowl, in a manner to be described below.

As shown in FIG. 1, cutting tool 14 is removable from main platform 12 in the direction of arrow A. To facilitate manual manipulation of cutting tool 14, e.g., the insertion and removal of cutting tool 14 into and from main platform 12, handle 18 is provided on the proximal end thereof. As shown in the figures, handle 18 consists primarily of a hole cut into the proximal end of the housing of cutting tool 14, however other forms of handles are also contemplated as being within the scope of the invention. A grater 19 is optionally provided alongside main platform 12 for added functionality of the unit.

Figure 3:
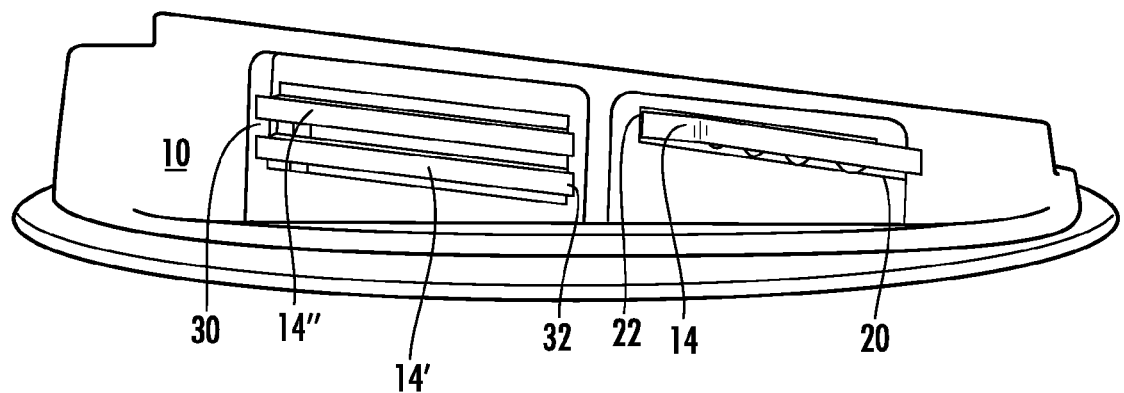
FIG. 3 is a side elevation view of the of the salad bowl mandoline slicer of FIGS. 1 and 2.
Figure 4:
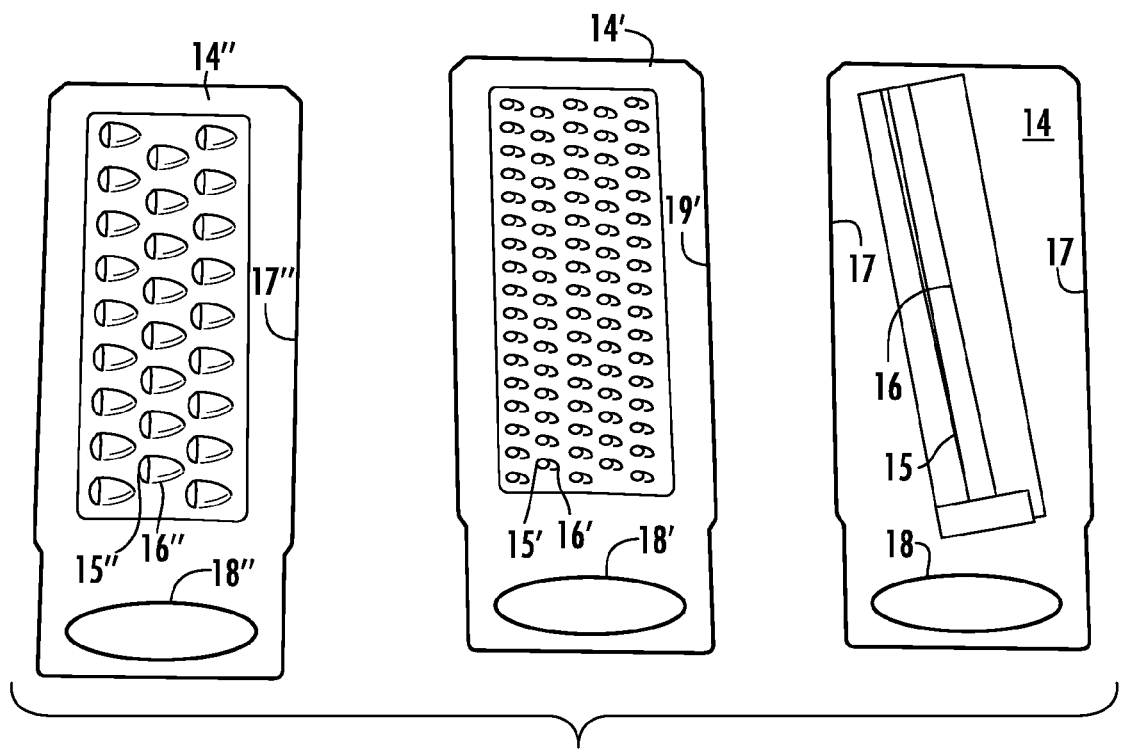
FIG. 4 is a top elevation view of a series of cutting tools of a salad bowl mandoline slicer in accordance with the invention, e.g., the slicer of FIGS. 1-3.
Figure 5:
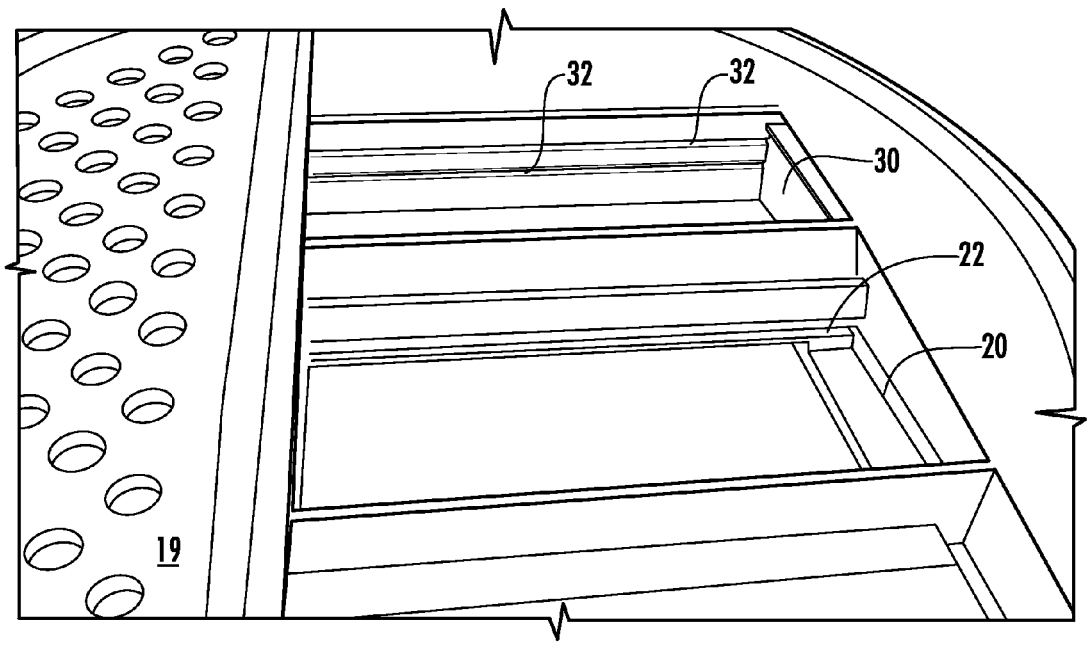
FIG. 5 is a bottom perspective view of the salad bowl mandoline slicer of FIGS. 1-3 with the cutting tools removed to show the working and storage slots.

A side view of slicer 10 is shown in FIG. 3, and a bottom view of slicer 10 is shown in FIG. 5. In FIG. 3, cutting tool 14 is shown disposed in working slot 20, which places the cutting edge of the cutting tool 14 in a position that is substantially co-planar with main platform 12 as shown in FIGS. 1 and 2. As shown in FIGS. 1 and 4, cutting tool 14 includes lateral flanges 17 that are adapted to slide into and fit within opposed lateral grooves 22 (see FIGS. 3 and 5) of working slot 20. Preferably, left and right lateral flanges 17 are provided, corresponding to left and right lateral grooves 22 of working slot 20. The mating flanges and grooves ensure the smooth insertion and removal of cutting tool 14 from working slot 20, and additionally ensure that cutting tool 14 is consistently positioned in the correct manner, i.e., with cutting blade 16 substantially perpendicular to the direction of travel of food across main platform 12.

As also shown in FIGS. 3 and 5, a storage slot 30 is provided in slicer 10 underneath main platform 12 for storing additional cutting tools 14' and 14". Storage slot 30 includes right and left lateral grooves 32. In the preferred embodiment, since three interchangeable cutting tools 14, 14', and 14" are provided, storage slot 30 includes two sets of lateral grooves (i.e., two right grooves and two left grooves), so that up to three cutting tools may be accommodated, one in working slot 20 and the other two in storage slot 30. More or fewer sets of grooves may be provided in storage slot 30 depending on the number of cutting tools provided with the unit.

FIG. 4 depicts the three cutting tools 14, 14', and 14" of the preferred embodiment. Each is shown as having a cutting blade 16, 16', or 16" disposed next to a space 15, 15', or 15". Each includes lateral flanges 17, 17', or 17", and each has a handle 18, 18', or 18". Cutting tool 14 is a slicer, having a single cutting blade 16 angled slightly upwardly from the upper surface of cutting tool 14. Cutting tool 14' is a small bore or fine grater, suitable for cheese and the like. Cutting tool 14" is a large bore or coarse grater, suitable for vegetables, fleshy fruit such as apples, etc.

Figure 6:
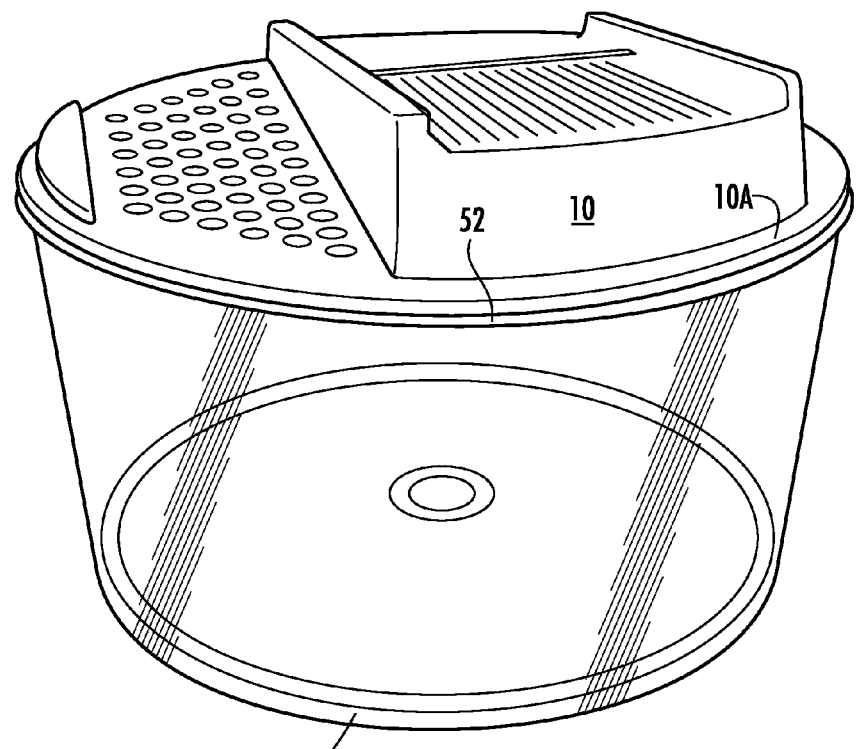
FIG. 6 is a perspective view of the salad bowl mandoline slicer of FIGS. 1-3 and 5 disposed atop a salad bowl in accordance with the invention.
Figure 7:
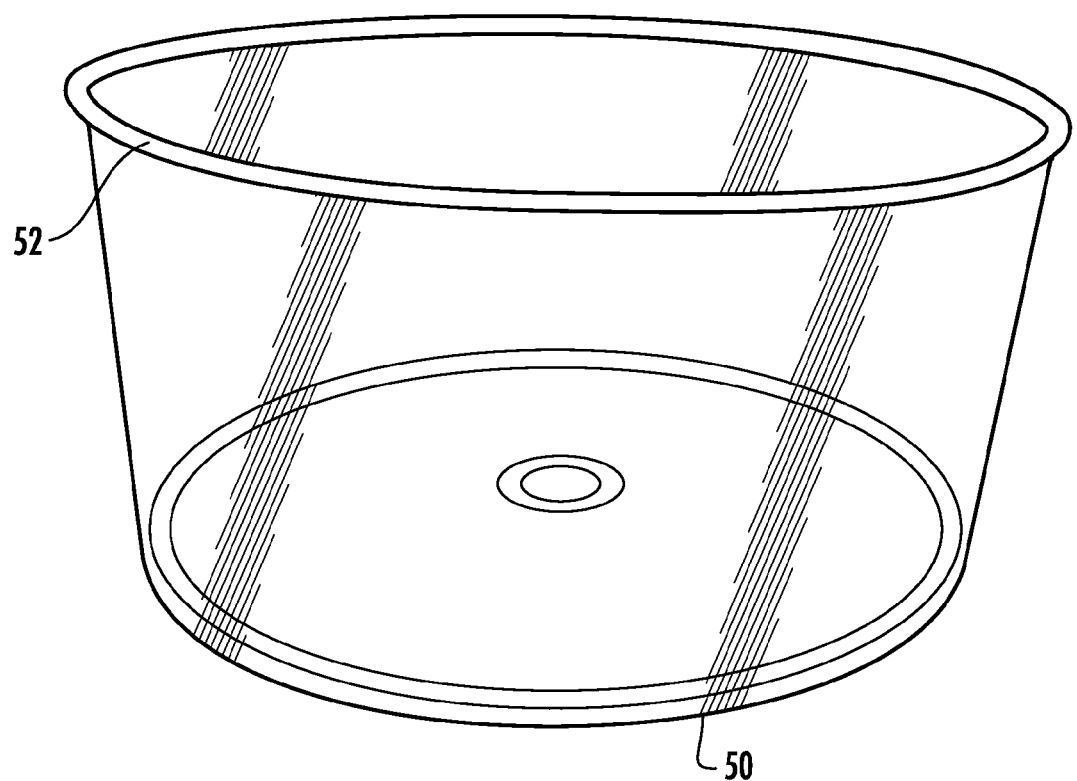
FIG. 7 is a perspective view of the salad bowl component of the invention.

As mentioned above, when food is slid along main platform 12 and across cutting tool 14, blade 16 slices, dices, or grates a portion of the food which falls down through space 15. As shown in FIGS. 6 and 7, mandoline slicer 10 is configured to sit atop salad bowl 50, so that when reduced food falls down through space 15, it falls directly into salad bowl 50 and onto the lettuce contained therein. Salad bowl 50 has an upper rim 52, and mandoline slicer 10 has an outer rim 10A that is configured to mate and/or fit together with upper rim 52. As shown in the drawings, slicer 10 is generally circular or disk-like in shape, with main platform being angled or canted. That is, salad bowl 50 and slicer 10 are depicted to be round and thus have a circular profile. This shape is preferred to facilitate the engagement of the bowl and the slicer, since it does not matter in which direction or orientation the slicer is placed relative to the bowl, owing to their radial symmetry. However, any shape of bowl and slicer is contemplated as being within the scope of the invention, just as long as outer rim 10A of slicer 10 is adapted to fit together with upper rim 52 of bowl 50.

Figure 8:
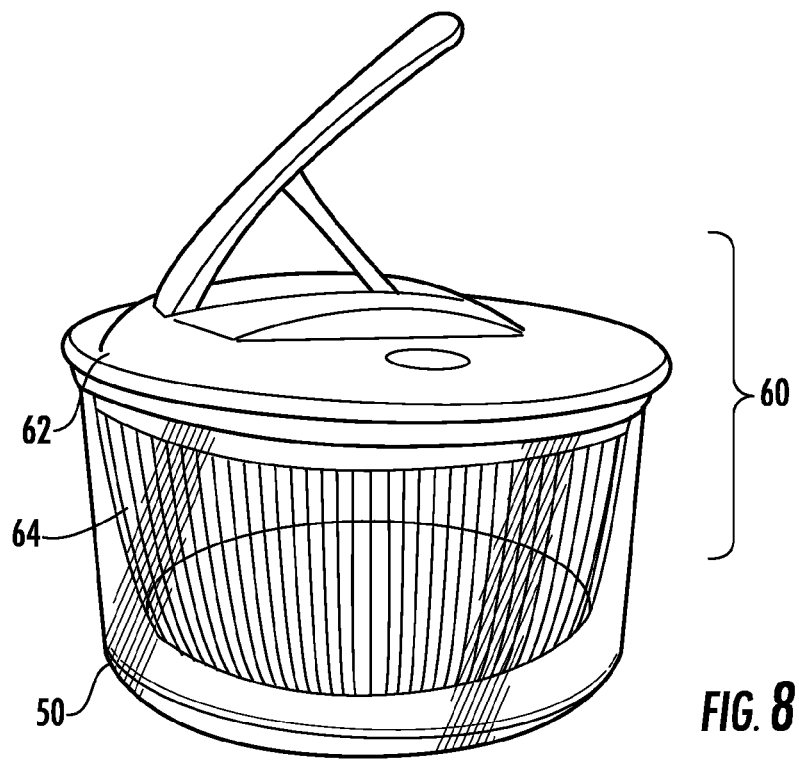
FIG. 8 is a perspective view of the salad bowl component of FIG. 7 with a salad spinner colander disposed therein and a salad spinner vertically reciprocable actuator disposed thereon in place of the mandoline slicer of the invention. An alternative embodiment of the invention has a more traditional salad spinner actuator in the form of a rotatable handle with an arm centrally pivoted which is mechanically connected to cause rotation of a basket within the bowl.

Of course, since it is desirable to provide a salad spinner (see FIG. 8) with the invention, a round bowl, and thus a round slicer, are preferred. FIG. 8 depicts bowl 50 with a salad spinner 60. Spinner 60 includes a vertically reciprocable actuator 62 disposed atop upper rim 52, and a rotatable colander-like inner salad holder 64 (a basket) disposed within bowl 50 and in mechanical engagement with rotating actuator 62. Salad spinner 60 functions to cause the colander or basket to rapidly spin, throwing off the water in the process, in a manner well known in the art, and its further description need not be made. Alternatively, a more conventional actuator of the central pivoted arm and a rotatable handle is provided to spin the colander/basket.

A snap-on lid, securable to the upper rim of salad bowl 50, may be provided as another optional feature. Before or after serving the salad, the snap-on lid can seal the salad bowl and protect and preserve the contents therein.

The invention is not limited to the above description. For example, the portion of mandoline slicer 10 that engages the upper rim 52 of bowl 50 is outer rim 10A. However, the engaging rim portion of slicer 10 need not be the outermost structure on slicer 10; adding flanges or handles or similar structure (not shown) to facilitate removal and placement of the slicer atop the bowl is considered to be within the scope of the invention.

Having described certain embodiments of the invention, it should be understood that the invention is not limited to the above description or the attached exemplary drawings. Rather, the scope of the invention is defined by the claims appearing hereinbelow and any equivalents thereof as would be appreciated by one of ordinary skill in the art.

What is claimed is:

1. A mandoline slicer integrated into the lid of a salad bowl, comprising:
   a rim adapted to fit on an upper rim of a salad bowl;
   a main platform area having an included sliding surface along which food can slide for cutting;
   a cutting tool area for holding a first cutting tool having at least one cutting edge extending above and disposable across said main platform area and a space adjacent said at least one cutting edge for allowing passage of sliced food from said platform area into the salad bowl; and
   a separate second cutting tool, said second cutting tool interchangeable with said first cutting tool into said cutting tool area, said second cutting tool having a different cutting edge configuration in comparison to that of said first cutting tool, and said second cutting tool having a storage location when not in use located adjacent to said main platform area yet separated from said sliding surface, said second cutting tool when in said storage location being directly beneath and parallel to said cutting tool area;
   said cutting tools having outwardly extending handles to allow holding of the same beyond the cutting edges of said cutting tool;
   wherein when food is slid across said main platform area, said cutting edge of either said first or said second cutting tool then located in said cutting tool area removes a quantity of the food, and said removed quantity falls through said space and into the salad bowl;
   said mandolin slicer further comprising a first slot and said cutting tool being insertable into said first slot substantially co-planar with an upper surface of said main platform.

2. A mandoline slicer for a salad bowl according to claim 1, further comprising a second slot disposed below said upper surface, said cutting tool being selectively disposable in said second slot for storage.

3. A mandoline slicer for a salad bowl according to claim 1, wherein said first and second cutting tools each comprise one of a slicer, a dicer, or a grater.

4. A multi-function salad preparation unit, comprising:
   a salad bowl having an open food collecting chamber and an upper rim; and
   a salad bowl mandoline slicer component integrated into the lid of the salad bowl, comprising:
      a rim adapted to fit selectively on said upper rim of said salad bowl;
      a main and inclined platform area having an included sliding food surface along which food can slide;
      a cutting tool area for holding a first cutting tool having at least one cutting edge extending above said sliding food surface and a space adjacent said cutting tool area, said space being open to said chamber; and
      at least one separate second cutting tool, said second cutting tool interchangeable with said first cutting tool into said cutting tool area, and said second cutting tool having a storage area separate from said sliding food surface, said second cutting tool when in said storage location being directly beneath with the cutting edge parallel to said cutting tool area;
      said cutting tools having outwardly extending handles to allow holding of the same beyond the cutting edges of said cutting tool;
      wherein when food is slid across said main platform area, said cutting edge of either said first or said second cutting tool then located in said cutting tool area removes a quantity of the food, and said removed quantity falls through said space and into said chamber of said salad bowl;
      said mandolin slicer further comprising a first slot and said cutting tool being insertable into said first slot substantially co-planar with an upper surface of said main platform.

5. A multi-function salad preparation unit according to claim 4, further comprising a second slot disposed below said upper surface, said cutting tool being selectively disposable in said second slot for storage.

6. A multi-function salad preparation unit according to claim 4, wherein said first and second cutting tools each comprise one of a slicer, a dicer, or a grater.

7. A multi-function salad preparation unit according to claim 4, further comprising a salad spinner having a rotatable colander disposable in said salad bowl and a rotational actuator selectively disposable atop said upper rim of said salad bowl in place of said mandoline slicer.

8. A multi-function salad preparation unit according to claim 4, further comprising a lid sealingly attachable to said upper rim of said salad bowl in place of said mandoline slicer.

* * * * *